Oct. 18, 1927.
E. P. CRESSLER
1,646,232
ARTIFICIAL TOOTH
Filed Feb. 19, 1925
2 Sheets-Sheet 1
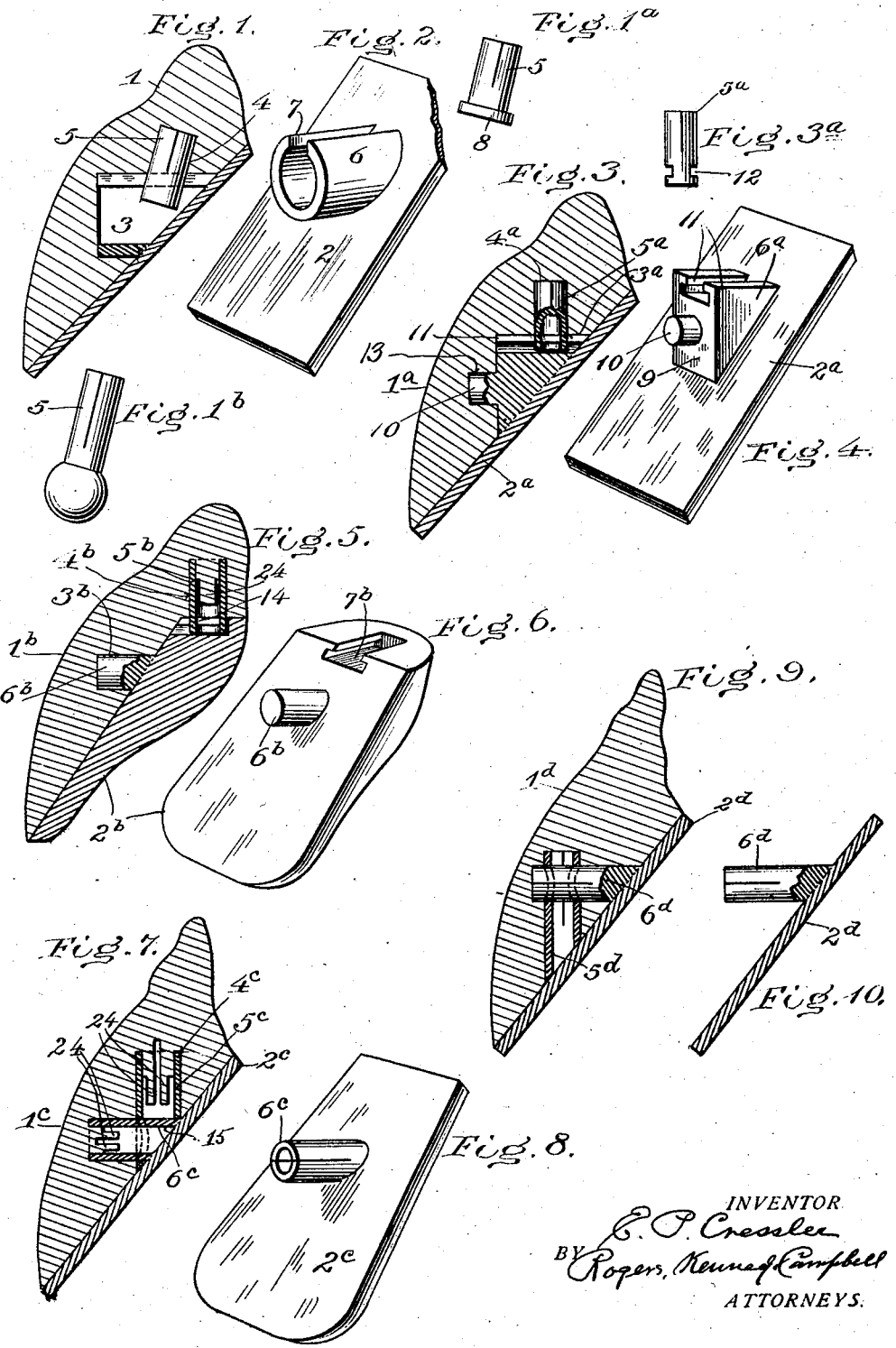

Oct. 18, 1927.
E. P. CRESSLER
ARTIFICIAL TOOTH
Filed Feb. 19, 1925
1,646,232
2 Sheets-Sheet 2
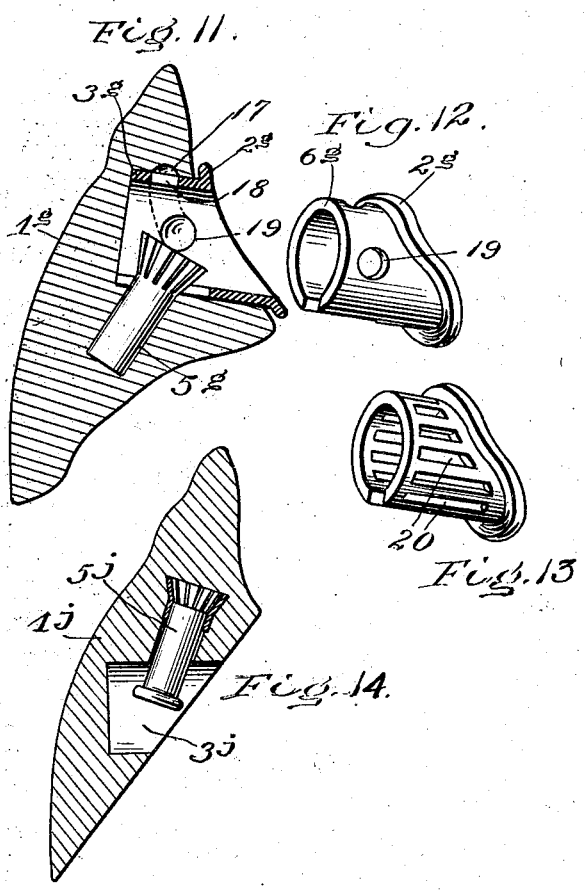

Patented Oct. 18, 1927.

1,646,232

UNITED STATES PATENT OFFICE.

EDWARD P. CRESSLER, OF NEWTON, KANSAS.

ARTIFICIAL TOOTH.

Application filed February 19, 1925. Serial No. 10,198.

This invention relates to artificial teeth and has reference more particularly to a form and construction of the parts adapted to secure a firm, but detachable connection, of the tooth facing with the backing or retaining member, in order to adapt the construction for use in connection with bridge or crown work, and for vulcanite or plate work.

The object of the invention is to produce a form of connection between the tooth facing and backing plate or member, which will be of extreme effectiveness in holding the parts in firm and secure engagement with each other without danger of loosening or displacement, and yet will admit of a new facing being readily substituted for a broken facing; and with these and other objects in view the invention consists of the novel construction and arrangement of parts fully described in the specification to follow, and the novel features of which will be set forth in the appended claims.

In the accompanying drawings:

Fig. 1 is a side elevation, partly in section, of a tooth of anterior form having my invention embodied therein in one form.

Figs. 1ª and 1ᵇ are views of modified forms of the fastening pin of Fig. 1.

Fig. 2 is a perspective view of the retaining member or plate of Fig. 1 separated from the tooth facing.

Figs. 3, 5, 7, and 9 are views similar to Fig. 1, showing the invention in different modified forms.

Fig. 3ª is an elevation of a detail of Fig. 3.

Figs. 4, 6, 8, and 10 are perspective views of the retaining plates or members of said figures respectively, detached from the tooth facing.

Fig. 11 is a sectional view of a tooth embodying the invention in a form to adapt the same for use in connection with vulcanite or plate work;

Fig. 12 is a perspective view of the retaining member of Fig. 11, removed from the tooth facing;

Fig. 13 is a perspective view of a modified form of the retaining member of Figs. 11 and 12;

Fig. 14 is a sectional view of a tooth facing showing the retaining pin soldered to a core fused in the facing.

Referring to the drawings:

Referring to Figs. 1 and 2, the reference numeral 1 designates a tooth facing or body of suitable material, for instance porcelain, and in this instance a tooth of anterior form, and 2 designates a backing member adapted to seat against the rear face of the tooth facing and be secured thereto, which member is in the present instance in the form of a flat plate. To enable the backing member to be firmly attached to the tooth facing to secure their rigid and effective union, while permitting of the replacement of the tooth facing by a new one in the event of the same becoming broken or injured, the tooth facing in accordance with my invention, has formed in its rear side a recess 3 from which extends upwardly at an angle thereto, a hole 4. A pin 5 is seated and secured in the hole, and has its lower end projecting downwardly into the recess. The backing member 2 is provided on its front face with a tubular projection 6 which is adapted to seat in the recess, and this projection is formed with a longitudinal slot or opening 7 so that when the tubular projection is entered in the recess, the projecting end of the pin will be received in the slot and the projection will thus become interlocked with the pin. It will be understood that the pin is fastened in the hole in the tooth facing, the projection on the plate secured in the recess, and the plate fastened to the rear face of the tooth facing, by a suitable cement, so that when the retaining member is pushed home to its seat on the tooth facing, the cement will act to secure the parts firmly together as a unitary solid structure.

The pin 5 may be symmetrical and of uniform diameter throughout, or may be provided on its lower end where it projects into the recess, with a head 8, which head may be flat as shown in Fig. 1ª, or may be rounded as shown in Fig. 1ᵇ. To adapt the pin to be retained temporarily in the hole during the assemblage of the parts, it may be split longitudinally as shown to give it some resiliency or spring.

It will be observed that the recess 3 and the hole 4 which receive respectively the projection 6 on the backing plate, and the pin 5, are disposed in angular relations to each other, and in angular relations to the rear flat face of the tooth facing. Due to this fact, the greatest resistance will be offered to the displacement or escape of the tooth facing from the attaching parts, and a connection of the parts will be formed which will bring about their effective and firm union, while at the same time permitting of the ready removal of a broken or injured tooth facing.

In Figs. 3 and 4 the construction is very similar to that just described, the main differences being in the specific form of the projection 6ª on the backing plate, and the form of the pin 5ª. The projection 6ª in this instance is of wedge form having a face 9 from which projects a solid pin 10. The wedge projection at its thicker end is formed with inwardly extending lips 11, which, when the projection is seated in the recess 3ª, will enter slots 12 in the sides of the pin 5ª, while the pin 10 on the projection 6ª will seat in a hole 13 extending into the body of the tooth facing from the recess 3ª in a direction at right angles to the hole 4ª.

In Figs. 5 and 6 the projection 6ᵇ on the backing plate is of cylindrical form and seats in a corresponding recess 3ᵇ in the tooth facing, the said backing plate at its upper end being formed with an angular lip or flange containing a slot 7ᵇ, which, when the backing plate is seated against the rear face of the tooth facing, will engage in slots 14 in the projecting end of a pin 5ᵇ seated in a hole 4ᵇ in the tooth facing and extending at an angle to the recess 3ᵇ.

In Figs. 7 and 8 the projection 6ᶜ on the backing plate is of tubular form, and is adapted to engage in a hole 15 in a tubular pin 5ᶜ seated in a hole 4ᶜ in the tooth facing, whereby the pin on the retaining member will be interlocked with the pin on the tooth facing. The two holes in the tooth facing in Fig. 7, which receive respectively the tubular projections 6ᶜ and the pin 5ᶜ, diverge from each other forwardly from the rear face of the tooth facing, substantially at right angles.

In Figs. 9 and 10 the construction is substantially the same as shown in Figs. 7 and 8, except that the angles of the holes in the tooth facing, receiving the pin 5ᵈ and the projection 6ᵈ on the backing plate, converge towards and intersect each other, from the rear face of the tooth facing.

Figs. 11 and 12 show the invention especially adapted for vulcanite teeth and plate work. In these figures the retaining member or plate 2ᵍ is in the form of a rounded bead or flange from which the tubular slotted projection 6ᵍ extends. This projection seats, as before, in a recess 3ᵍ in the tooth facing, and the slot in the tubular projection engages around and interlocks with the inner end of a pin 5ᵍ seated and secured in the tooth facing, the inner end of the pin where it extends into the recess being slitted and flared so as to form in effect an engaging head for the tubular projections 6ᵍ. It will be understood that in this form of the invention, for vulcanite teeth and plate work, the vulcanite composition will flow into the recess and the hole in the tooth facing and will act to secure the pin and tubular projection firmly in place, and will embed the rounded flange or retaining member, and thus effect a firm connection between the vulcanite body or mass, and the tooth facing and interlocking parts. To cause the vulcanite material to better hold the parts together, the recess 3ᵍ is formed in its upper wall with a groove 17, and a transverse hole 18 is formed in the tooth facing, and adapted when the tubular projection 6ᵍ enters the recess, to align with the groove 17, which latter communicates at its ends with holes 19 formed in the sides of said projection, the vulcanite material flowing into the groove and holes and operating to effectually lock the parts together. If desired, the tubular projection 6ᵍ may be formed as shown in Fig. 13 with a series of longitudinal slots 20 to receive the cementing vulcanite material to more effectually cement the tubular projection in place.

It will be observed that in Figs. 5 and 7, the holes formed in the tooth facing are shaped so as to leave a central core 24, which, when the parts are assembled, is surrounded by the tubular pin 5ᵇ of Fig. 5, and the pin 5ᶜ and projection 6ᶜ of Fig. 7. By forming a hole or groove in this core as best shown in Fig. 7, the core may be more readily broken and removed in freeing the tooth facing from the engaging parts, when a broken tooth is to be replaced.

It will be understood that the pin 5 and projections 6 in the various forms of the invention illustrated, may take on different forms as shown and as above described. The pins for instance may be solid or tubular, and of uniform diameter throughout, or may be provided with a head, or may be slotted to form in effect a head, or may be split to give them resiliency to hold them temporarily in the holes in the tooth facing in the assemblage of the parts. They may be baked or fused into the porcelain, or soldered to a core fused within the porcelain tooth, as shown in Fig. 14. And, likewise, the tubular projection 6 may be in different forms, either tubular or solid, or of wedge form, and may be slotted in different ways to enable them to interlock with the pins, these details being susceptible of various changes and modifications which will realize the aims and advantages of the invention and will be embraced in the spirit thereof.

It will be noted in connection with the various embodiments of the invention as hereinbefore described, that the opening or slot in the projection on the backing plate which receives the pin in the forms of the invention illustrated in Figs. 1 to 6, and the opening in the pin which receives the projection on the backing plate in the forms of the invention shown in Figs. 7 to 9, extend in a direction facewise of the tooth, so that the tooth may be engaged in interlocking relation with the backing plate by a "direct on" facewise movement of the tooth, that is, by a horizontal movement in a direction toward the lingual surface. This feature of construction and functional operation I deem of importance and advantage in that it avoids the engagement of the parts by a relative movement of the same lengthwise of the tooth, which is objectionable for reasons obvious to those skilled in the art. This form and relation of the parts will be best understood from an inspection of Figs. 1 and 2, where it will be seen that the tubular projection 6 on the backing plate extends at an angle to the plate, and the slot or opening 7 therein which receives the pin, extends lengthwise of the projection, or in other words facewise of the tooth, the result being that the tooth facing may be engaged in interlocking relation with the backing plate by a movement of the tooth facing in a straight line in a direction facewise of the plate. In other words by a "direct on" action.

Having thus described my invention, what I claim is:

1. In an artificial tooth, the combination of a tooth facing, the rear face of which is provided with a substantially plane surface and a recess opening into the surface, a pin carried by the facing and extending into the recess, and a backing-plate having a projection thereon adapted to seat in the recess and to engage and interlock with the pin, said pin and projection being of such form and relative arrangement that the facing may be engaged in interlocking relation with the backing plate by a horizontal movement in a direction toward the lingual surface.

2. In an artificial tooth, the combination of a tooth facing, the rear face of which is provided with a substantially plane surface and a recess opening into the surface, a pin carried by said facing and extending into the recess, and a backing plate thereon having a projection thereon adapted to seat in the recess, the projection being formed with an opening extending at an angle to the face of the tooth to receive the pin, the tooth facing being adapted to be engaged in interlocking relation with the backing plate by a horizontal movement in a direction toward the lingual surface.

3. In an artificial tooth, the combination of a tooth facing, the rear face of which is provided with a substantially plane surface and a recess opening into the surface, a pin carried by said facing and extending into the recess, a backing plate and a projection thereon adapted to seat in the recess and provided with a slot extending facewise of the tooth and adapted to receive the pin, the tooth facing being adapted to be engaged in interlocking relation with the backing plate by a horizontal movement in a direction toward the lingual surface.

4. A facing provided with a root extension and an occlusally-disposed surface, a pin extending from the said surface, a backing provided with a surface corresponding to the surface of the facing and provided with means to interlock with the pin, the surfaces being so disposed that the backing and facing are assembled by a horizontal sliding movement toward the lingual surface.

5. A facing provided with a root extension and an occlusally-disposed surface, a pin extending from the said surface, a backing provided with a surface corresponding to the surface of the facing and provided with means to interlock with the pin, the surfaces being so disposed that the backing and facing are assembled by a horizontal sliding movement toward the lingual surface and a projection on the backing extending into the facing.

In testimony whereof, I have affixed my signature hereto.

EDWARD P. CRESSLER.